US006500014B2

(12) United States Patent
Sugata

(10) Patent No.: US 6,500,014 B2
(45) Date of Patent: Dec. 31, 2002

(54) CONNECTOR STRUCTURE INCORPORATING A CABLE REEL AND COMBINED SWITCH SYSTEMS

(75) Inventor: Shoichi Sugata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/828,959

(22) Filed: Apr. 10, 2001

(65) Prior Publication Data
US 2001/0030115 A1 Oct. 18, 2001

(30) Foreign Application Priority Data

Apr. 14, 2000 (JP) .......................... 2000-114184

(51) Int. Cl.[7] .............................. H01R 3/00; H01H 9/00
(52) U.S. Cl. ...................... 439/147; 200/61.54; 439/15
(58) Field of Search ..................... 200/61.27, 61.38, 200/61.54, 61.58; 439/15, 164

(56) References Cited

U.S. PATENT DOCUMENTS

| 5,747,763 A | * | 5/1998 | Uchiyama et al. | ........ 200/61.54 |
| 5,766,019 A | * | 6/1998 | Matsumoto et al. | .......... 439/15 |
| 5,883,348 A | * | 3/1999 | Yokoyama | ............... 200/61.54 |
| 5,936,215 A |   | 8/1999 | Masuda et al. | ........... 200/61.3 |
| 5,971,782 A |   | 10/1999 | Masuda et al. | ............. 439/164 |
| 6,267,610 B1 | * | 7/2001 | Sugata | ........................ 439/164 |

FOREIGN PATENT DOCUMENTS

JP          11297166        10/1999

OTHER PUBLICATIONS

English Language abstract of JP–11–297166.

* cited by examiner

Primary Examiner—J. R. Scott
(74) Attorney, Agent, or Firm—Greenblum & Bernstein, P.L.C.

(57) ABSTRACT

A connector structure includes a connector shell, and incorporates a cable reel, an encoder, and a turn-indicator system and a lighting system. The connector shell has an axis, and is configured to be joined with a steering shaft having an axis. The connector shell includes a cylindrical section fitted around the steering shaft in a freely rotatable manner, and a receptacle section which includes a shoulder portion extending outwardly from one end of the cylindrical section, a peripheral sidewall portion, and first and second parting strip portions symmetrically provided with respect to the axis of the connector shell, thereby forming, inside the receptacle section, a central zone between the first and second parting strip portions, a first peripheral zone between the peripheral sidewall portion and the first parting strip portion, and a second peripheral zone between the peripheral sidewall portion and the second parting strip portion. The cable reel is then mounted and fixed in the central zone of the receptacle section. The turn-indicator system and the lighting system are mounted and fixed, respectively, in the first peripheral zone of the receptacle section and the second peripheral zone thereof. The connector structure further includes a shell lid which includes a top wall with a center hole and an external sidewall. The center hole is configured to receive the main axis of a steering wheel in a freely rotatable manner, and the top wall and the external sidewall cover the connector shell.

12 Claims, 5 Drawing Sheets

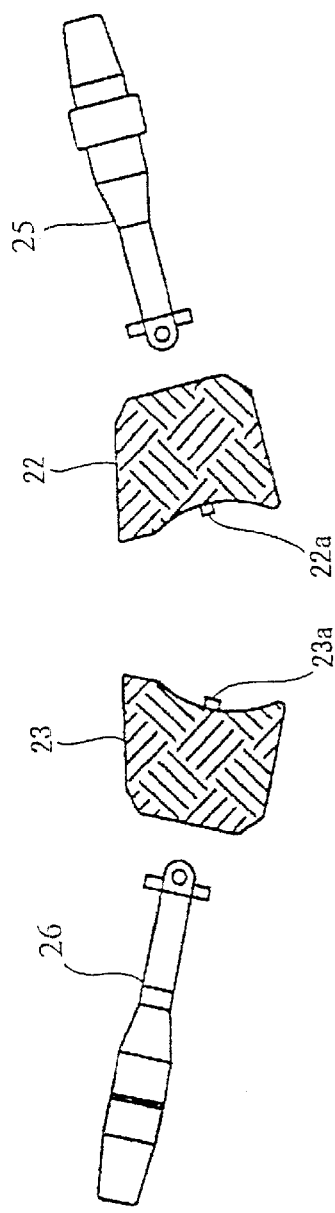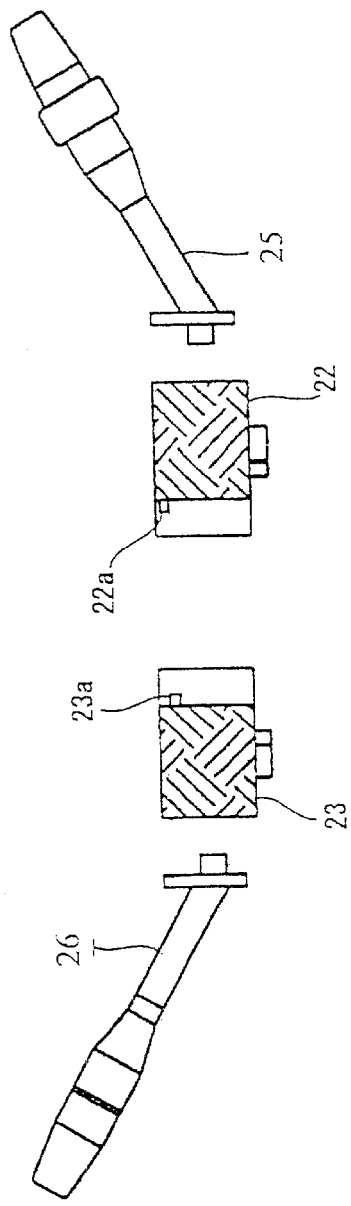
FIG.5A
FIG.5B

CONNECTOR STRUCTURE INCORPORATING A CABLE REEL AND COMBINED SWITCH SYSTEMS

BACKGROUND OF THE INVENTION

1. Field of the Invention

The present invention generally pertains to a connector structure incorporating a cable reel and combined switch systems, suitably used in automobiles and other motor vehicles. Such a connector structure is mounted on or around a steering shaft of a vehicle. The general purpose of the present invention is to provide a connector device for the steering shaft, which is configured such that it can be mounted simply by assembling unit modules.

2. Description of Background Information

A known steering shaft includes a main shaft body, around which is provided a connector structure including a cable reel, combination switches, a cancel cam, a main scale, an encoder, and the like. As shown in FIGS. 1 and 2, a mobile body portion 5 of the cable reel 1 is fixed to the bottom end of a steering wheel via means forming a lobe (not shown in the figures). A fixed body portion 2 of the cable reel 1, to which the mobile body portion 5 is fitted in a freely rotatable manner, is then fitted on a combination switch body 3, the latter being in turn fixed to a steering column 4. One side of the combination switch body 3 is provided with a turn-indicator unit (winker or blinker unit) 7, which includes a housing 7a storing circuit elements 7b such as a turn signal-indicator switch (winker or blinker switch), and a turn signal lever 7c. The other side of the combination switch body 3 is provided with a lighting unit 8, which includes a housing 8a storing circuit elements 8b such as a lighting switch, and a lighting lever 8c.

A space is formed between the combination switch body 3 and a steering shaft 9, located beneath the cable reel 1. Inside this space, the cancel cam 10 is fixed to the steering shaft 9, while the encoder (steering angle sensor) 11 is fixed to the steering column 4.

The cable reel 1 is in the form of a hollow torus defined by the fixed body portion 2 and the mobile body portion 5. The cable reel 1 can thus contain a flat cable 6 stored in a spiral. One end of the flat cable 6 is fixed to the fixed body portion 2, while the other end is fixed to the mobile body portion 5, so that the signals passing through the flat cable can be transmitted to outside. When the steering wheel is turned, the mobile body portion 5 is rotated clockwise or counter-clockwise correspondingly, and the flat cable 6 is likewise wound or unwound in the cable reel.

SUMMARY OF THE INVENTION

According to the above conception known in the prior art, the connector devices constituting a connector structure are mounted one by one around the steering shaft along the vehicle's production line. As a result, these devices are prone to be mounted askew relative to their intended positions with respect to the main axis of the steering shaft. Likewise, because the connector devices such as a turn indicator unit 7, a lighting unit 8, a cable reel 1, a cancel cam 10 and an encoder 11, are mounted individually, they must be prepared as individual units prior to assembling. Each connector device thus requires an individual housing and fixing means (e.g. bolts) or the like. The number of required spare parts is thus augmented.

In the above-mentioned prior art, each connector device is stored in an independent housing, and the cable reel 1 is mounted into the combination switch body 3. Because of this construction, the dimensions of the connector structure are made greater and larger as a whole. As a result, its weight is also increased. Moreover, the connector devices are usually manufactured by different manufacturers. Accordingly, when the connector device are being assembled, a certain degree of clearance must be provided between them, and an otherwise unnecessary space must be envisaged. The connector structure is thus made even larger.

In view of these problems, it is an object of the present invention to provide a connector structure in unitary modules, so that they can be mounted together on a production line and installed without misfitting with respect to their intended positions relative to the steering shaft axis. Another object is to reduce the number of necessary construction parts and assembly steps. Yet another object is to prevent the connector structure from scaling up and increasing weight by altering the relative position where the cable reel is mounted.

To this end, there is provided a connector structure incorporating a cable reel and switch system, the connector structure including a connector shell having an axis, and configured to be joined with a steering shaft having an axis, so that both axes can be joined.

The connector shell includes a cylindrical section, with two end portions, fitting around the steering shaft in a freely rotatable manner. The connector shell further includes a receptacle section including a shoulder portion enlarging from one end portion of the cylindrical section, a peripheral sidewall portion, and first and second parting strip portions symmetrically provided with respect to the axis of the connector shell, thereby forming, inside the receptacle section, a central zone between the first and second parting strip portions, a first peripheral zone between the peripheral sidewall portion of the receptacle section and the first parting strip portion, and a second peripheral zone between the peripheral sidewall portion of the receptacle section and the second parting strip portion.

The cable reel is then fitted and fixed in the central zone of the receptacle section.

The switch system includes at least a turn-indicator system and a lighting system, respectively fitted and fixed in the first peripheral zone of the receptacle portion and the second peripheral zone thereof.

Preferably, the cable reel includes a mobile body portion including a top wall and an internal sidewall, and the top wall includes a cancel cam formed unitarily and in one piece therewith.

Preferably yet, the cable reel includes a mobile body portion including a top wall and an internal sidewall with projecting portions, the projecting portions being fixed with a main scale, and the cable reel further includes a fixed body portion including a bottom wall and an external sidewall. The latter defines a third peripheral zone together with the peripheral sidewall portion of the receptacle section in a zone biased from said first and second peripheral zones around the axis of the connector shell, and the third peripheral zone contains an encoder, such that the encoder can detect the steering angle of the main scale.

Suitably, the connector structure further includes a shell lid which includes a top wall with a center hole and an external sidewall. The center hole is adapted to be passed through with the main axis of a steering wheel in a freely rotatable manner, and the top wall and the external sidewall cover the connector shell.

Preferably, the shell lid can also serve as a steering column cover.

As understood from the above, the connector shell is constructed substantially concentrically with respect to the main axis of the steering shaft. As the cable reel, turn-indicator system and lighting system are contained in such a connector shell, they are prevented from being biased from the predetermined positions when they are mounted around the main axis of the steering shaft. Further, the bottom end of the cylindrical section includes a flange portion which fixes to the steering column, so that the mounting site is limited to only one position. Accordingly, the mounting steps in the assembly line for automobiles can be reduced.

As the turn-indicator and lighting systems are stored in the connector shell, they are not required to be protected in separate housings. Further, the functional parts for these systems are stored as a whole in the connector shell. This can thus obviate the need for a space normally required for the separate housings. In addition, the cable reel is inserted into the central zone between the first and second parting strip portions. Accordingly, the height and horizontal size of the integrated connector structure can be reduced, and the entire structure becomes more compact. Furthermore, combination switches such as a turn-indicator system or a lighting system are not required to be protected in separate housings. Functional parts can thus be easily modified in or added to the above systems.

In the prior art connector structure, the connector devices, to be incorporated into the connector structure, are often supplied by different manufacturers. In such a case, a certain degree of clearance between different connector devices must be provided. In the inventive connector structure, such a clearance is no longer required, so that the corresponding space, otherwise necessary, can be eliminated. As a result, the connector structure can further be miniaturized.

The top area of the mobile body portion of the cable reel, which is contained in the connector shell, is provided with a cancel cam, while the bottom area thereof is provided with a main scale. Further, an encoder is provided in the peripheral zone formed between the cable reel and the peripheral sidewall portion of the connector shell. The position of the main scale can then be detected by the encoder. Typically, the peripheral zone where the encoder is installed is arranged in a position perpendicular to the axis linking the peripheral zones where the turn-indicator system and the lighting systems are located respectively.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which:

FIG. 5A is an exploded top plan view of the connector structure according to the present invention;

FIG. 5B is an exploded side elevational view of the connector structure according to the present invention;

DETAILED DESCRIPTION OF THE PREFERRED EMBODIMENTS

Figure 1:
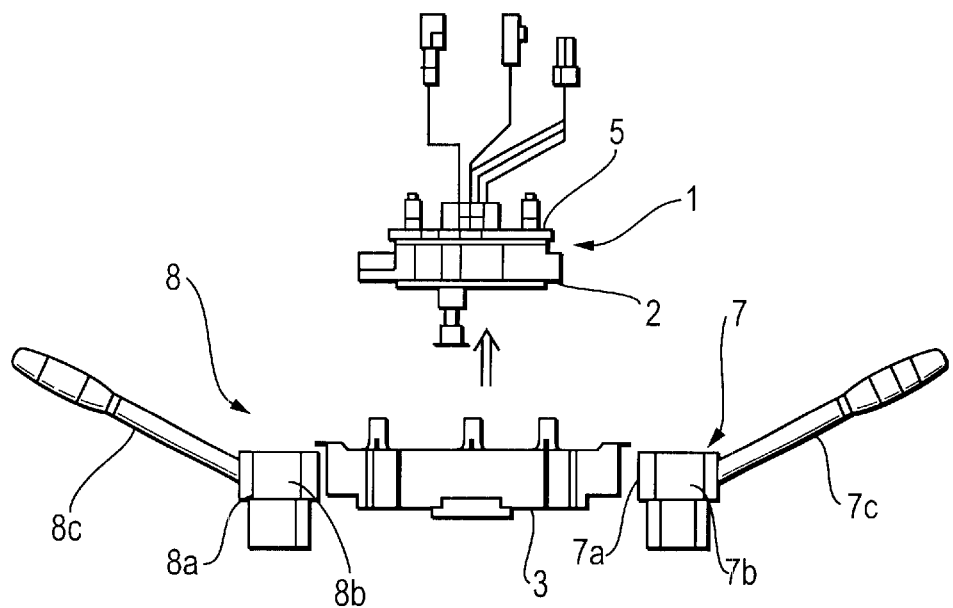
FIG. 1 is an exploded side view of a connector structure known in the prior art.
Figure 2:
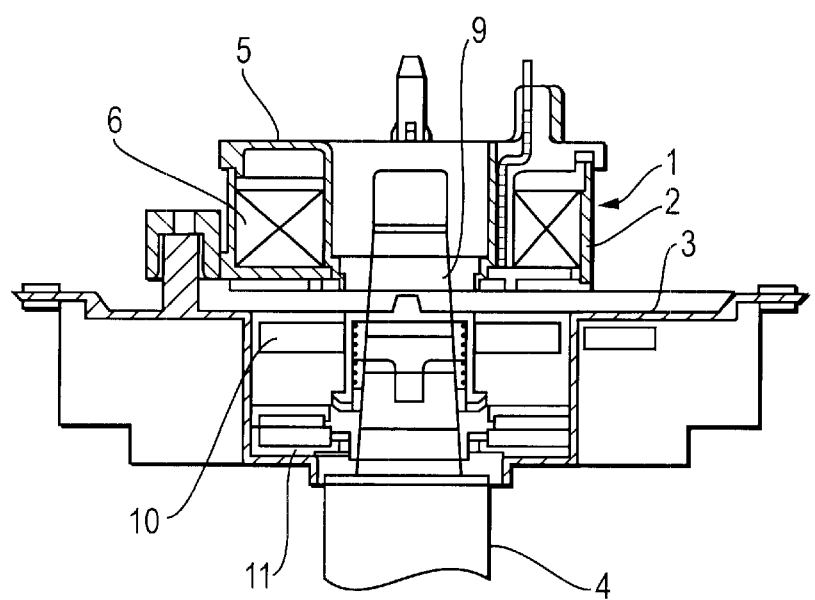
FIG. 2 is a cross-sectional side view of the assembled connector structure of the prior art.
Figure 3:
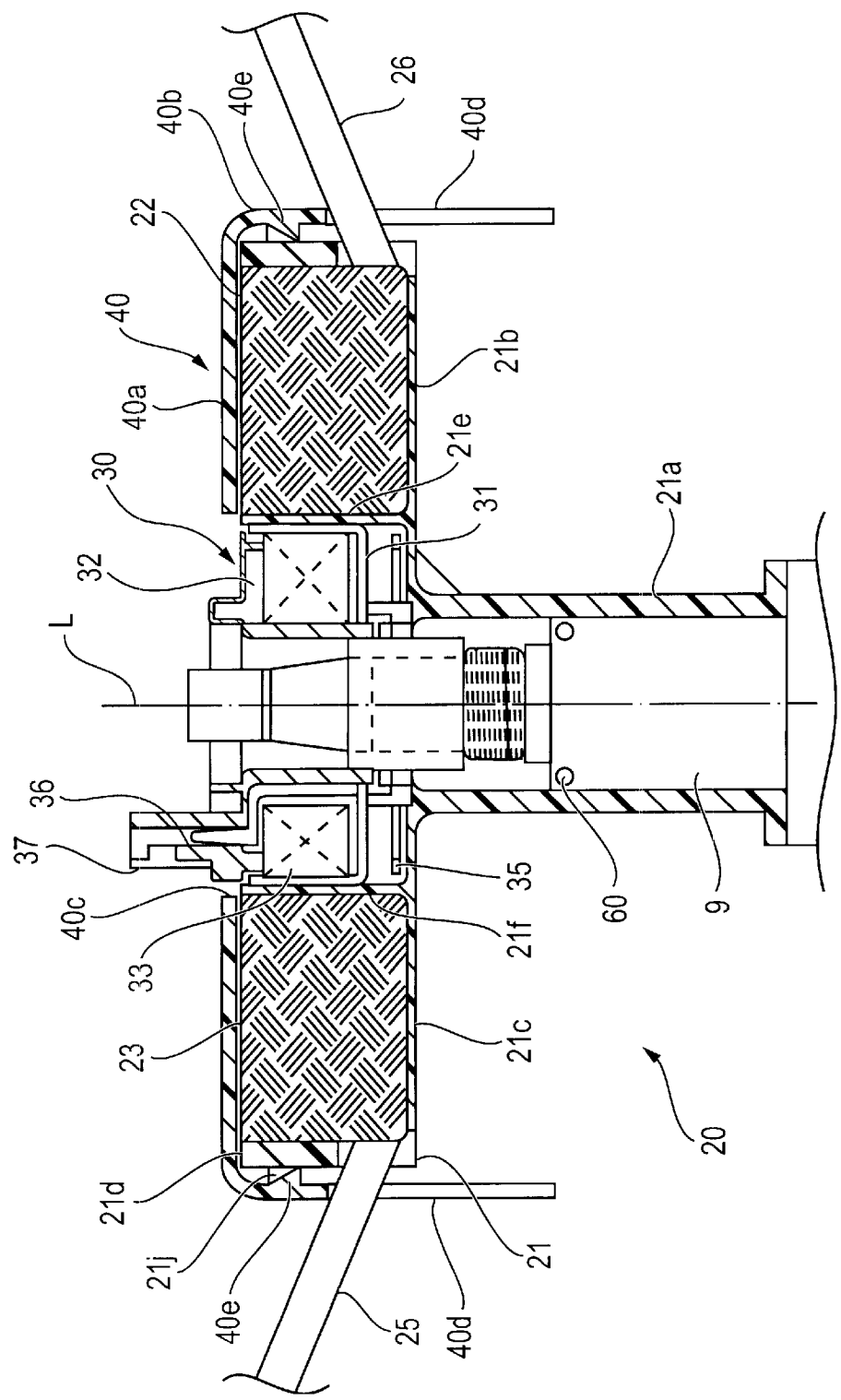
FIG. 3 is a cross-sectional side view of a connector structure according to the present invention.

FIG. 3 shows a connector structure 20 including a connector shell 21 and incorporating a cable reel 30 and combined switches. The connector shell 21 has a top opening, through which a cable reel 30, a turn-indicator system 22, a lighting system 23 and an encoder 24 and the like are mounted, and is covered with a shell lid 40.

Figure 4A:
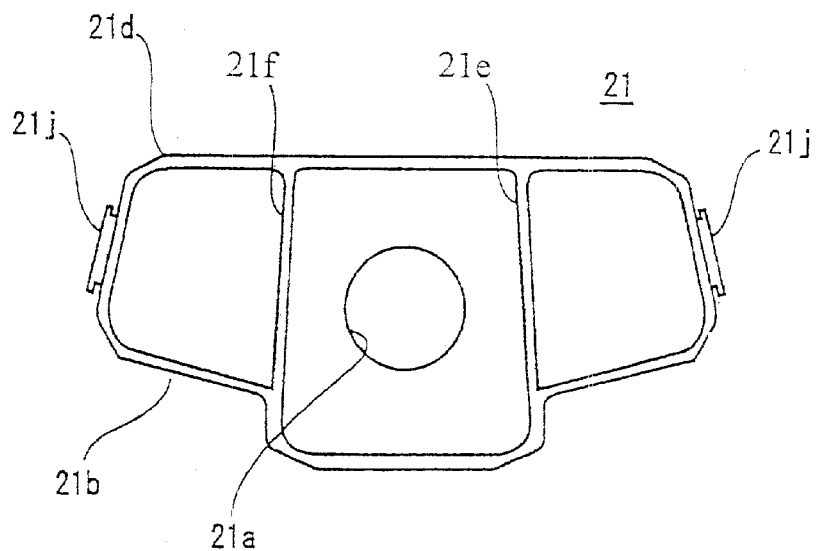
FIG. 4A is a schematic top plan view of a connector shell according to the present invention.
Figure 4B:
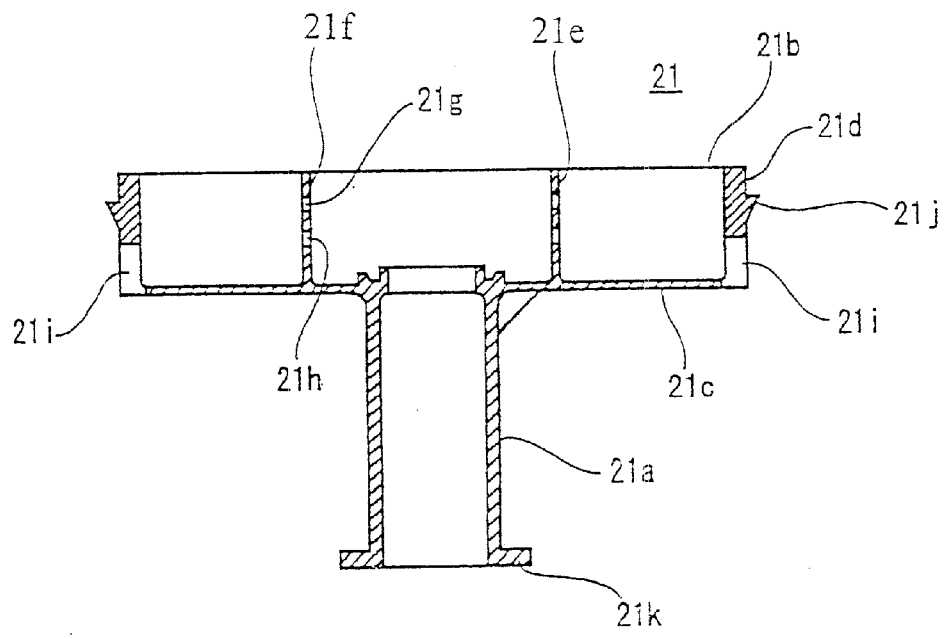
FIG. 4B is a schematic cross-sectional view of a connector shell according to the present invention.

The connector shell 21 is made of any suitable resin and formed into a shape shown in FIGS. 4A and 4B. This shape is configured so as to align with the axis L of a steering shaft 9. The connector shell 21 includes a cylindrical section 21a, into which the steering shaft 9 fits in a freely rotatable manner, and a receptacle section 21b enlarged from one end of the cylindrical section 21a in a direction perpendicular to the axis thereof. The receptacle section 21b includes a shoulder portion 21c, a peripheral sidewall portion 21d, and first and second parting strip portions 21e and 21f which are symmetrically opposed with respect to the axis of the cylindrical section 21a.

The first and second parting strip portions 21e and 21f are respectively provided with a reel-locking hole 21g for locking the cable reel 30, and a system-locking hole 21h for locking the corresponding turn-indicator system 22 or lighting system 23 (FIG. 4B). The distal areas of the peripheral sidewall portion 21d, respectively adjacent the turn-indicator system 22 and the lighting system 23, includes a respective notch 21i for passing a turn-indicator lever 25 or a lighting lever 26. The same areas, but above the notches, include a respective locking hook 21j for locking the shell-lid 40. The other end of the cylindrical section 21a, opposed to the receptacle section 21b, is provided with a flange portion 21k for fixing to a steering column.

Functional parts for the turn-indicator signal are grouped into a turn-indicator system 22, the latter including a sidewall with a first locking hook 22a (FIGS. 5A and 5B). The turn-indicator system 22 is then inserted, as a unitary module, into the space between the first parting strip portion 21e and the peripheral sidewall portion 21d. The first locking hook 22a is inserted into, and locked with, the system-locking hole 21h provided in the first parting strip portion 21e. The above turn-indicator system 22 incorporates a printed circuit board on which are provided integral circuit elements including a turn-indicator switch (not shown). The turn-indicator lever 25 is linked to the turn-indicator system 22 by one of its ends, and the other end extending outwardly through the notch 21i formed in the connector shell 21.

Likewise, functional parts for the lighting are grouped into a lighting system 23 which includes a sidewall with a second locking hook 23a. The lighting system 23 is then inserted, as a unitary module, into the space between the second parting strip portion 21f and the peripheral sidewall portion 21d. The second locking hook 23a is inserted into, and locked with, the system-locking hole 21h provided in the second parting strip portion 21f. The above lighting system 23 incorporates a printed circuit board, on which are provided integral circuit elements including a lighting switch (not shown). The lighting lever 26 is linked to the lighting system 23 by one of its ends, and the other end extending outwardly through the notch 21i formed in the connector shell 21.

As understood from above, the turn-indicator system 22 and the lighting system 23, which are stored in individual housings in the prior art, are now contained directly in the connector shell 21, without using separate housings.

Figure 6:
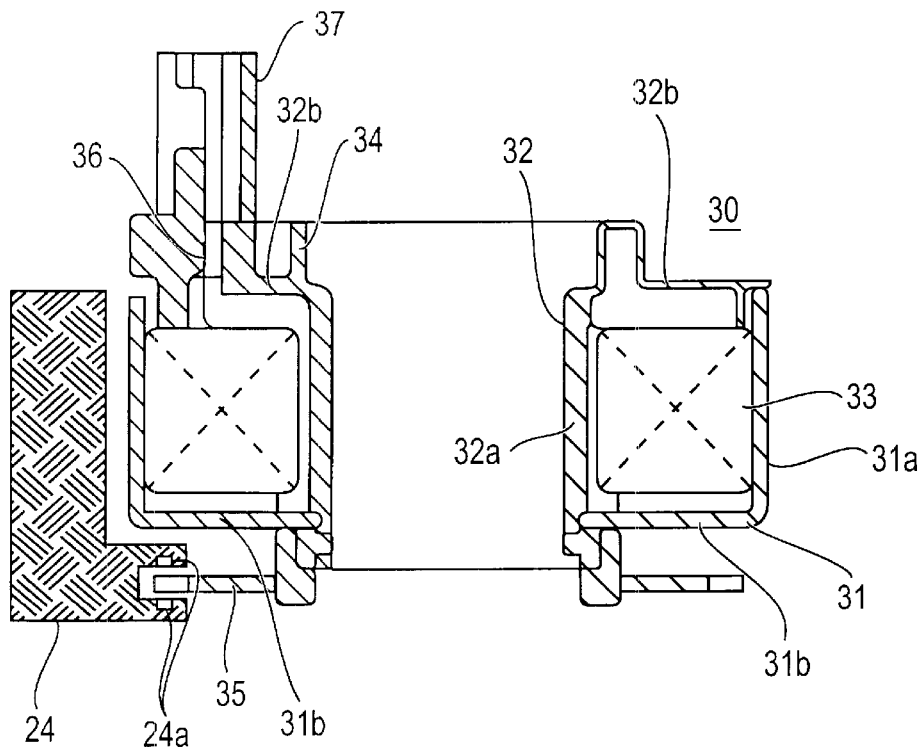
FIG. 6 is a cross-sectional side view of a cable reel according to the invention.

As shown in FIG. 6, the cable reel 30 includes a cable enclosure defined by a fixed body portion 31 and a mobile body portion 32 e.g. a rotor. The fixed body portion 31 includes an external circular sidewall 31a and a bottom wall 31b, while the mobile body portion 32 includes a top wall 32b and an internal circular sidewall. The cable enclosure then contains a flat cable 33 in a spiral condition. The top wall of the mobile body portion 32 then includes a cancel cam 34 projecting upwardly therefrom, and a connector portion 37 including a conductor 36 leading to the flat cable 33. The cancel cam 34 and the connector portion 37 are formed unitarily and in one piece with the mobile body portion 32. A cable terminal, connected to an inflator for an airbag, is inserted into the connector portion 37, and connected to the conductor 36.

The external circular sidewall 31a of the fixed body portion 31, to which the mobile body portion 32 is fitted in a freely rotatable manner, carries first and second locking hooks (not shown), respectively located at positions substantially opposed in a diametrical direction of the cable reel 30. When the cable reel 30 is fitted into the connector shell 21, the first and second locking hooks lock with the corresponding first and second locking holes 21g formed in the first and second parting strip portions 21e and 21f.

The internal circular sidewall 32a of the mobile body portion 32 includes bottom end sections or projecting portions, where the main scale 35 is mounted. Further, the encoder 24 is mounted in a space formed between the external circular sidewall 31a of the fixed body portion 31 and the peripheral sidewall portion 21d of the connector shell 21. The encoder 24 includes a sensor portion 24a, by which the steering angle of the main scale 35 can be detected.

Figure 7:
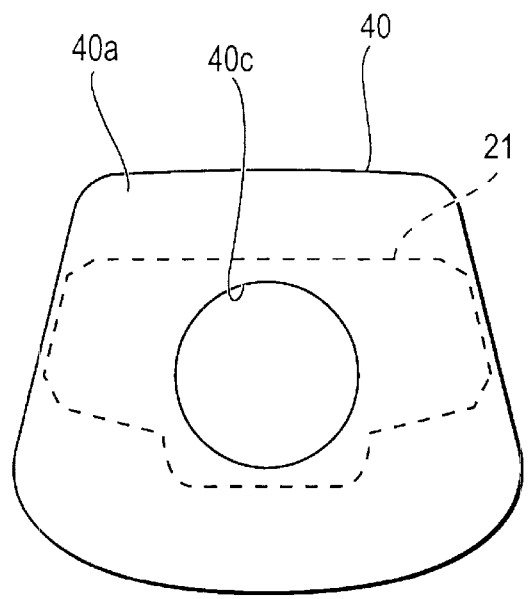
FIG. 7 is a top plan view of a shell lid, partly shown in phantom lines, according to the present invention.

The shell lid 40 includes a top wall portion 40a (note FIGS. 3 and 7) covering the top opening of the connector shell 21, and a peripheral sidewall portion 40b (note FIG. 3) extending from the top wall portion 40a down to near the base of the cylindrical section 21a of the connector shell 21. The shell lid 40 in the example is made of a suitable resin. The top wall portion 40a is provided with a center hole 40c, through which the main axis of the steering wheel is passed in a freely rotatable manner, during assembly of the vehicle. The peripheral sidewall portion 40b is provided with first and second notches 40d (FIG. 3), through which switch levers 25 and 26 are extended. Two distal areas on the peripheral sidewall portion 40b, located above the respective first and second notches 40d (as viewed in FIG. 3), are provided with a respective snap hook 40e for locking with a corresponding snap detent 21j formed on the peripheral sidewall portion 21d of the connector shell 21.

The shell lid 40 may also be configured so as to serve as a steering column cover known in the prior art. Alternatively, it may merely serve for closing the top opening of the connector shell 21.

As mentioned above, the inventive connector structure 20 includes a connector shell 21. This connector shell 21 includes a peripheral sidewall portion, a first parting strip portion and a second parting strip portion, and has a top opening. A cable reel 30 is then mounted into the connector shell 21 from the top opening thereof, so that the cable reel 30 is fitted into the central zone in the connector shell 21, formed between the first and the second parting strip portions 21e and 21f, and is locked thereto. Likewise, a turn-signal system 22 and a lighting system 23 are mounted into the connector shell 21 from the top opening thereof, so that they are fitted into the peripheral zone of the connector shell 21, formed between the peripheral sidewall portion 21d of the connector shell 21 and one of the first and second parting strip portions 21e and 21f, and locked therewith. An encoder 24 is fitted laterally onto the cable reel 30, prior to being fitted into the connector shell 21, at a position circumferentially biased from the positions where the turn-indicator and lighting systems are mounted.

As the connector structure 20 is now mounted with unitary modules, it can be assembled on a production line: the cylindrical section 21a of the connector shell 21 is fitted around a steering shaft 9 by virtue of a bearing 60, and the bottom end (as viewed in FIG. 3) of the steering shaft 9 is fixed to a steering column. Subsequently, a shell lid 40 is placed such that the main axis of the steering wheel passes through the center hole 40c. The shell lid 40 is fixed to the mobile body portion 32 of the cable reel 30.

In the above connector structure 20, a cable reel 30, a turn-indicator system 22 and a lighting system 23 are mounted into a connector shell 21, prior to being fixed on a steering shaft 9. When this connector structure 20 is mounted onto a steering shaft 9, it suffices to join the central axis of the connector shell 21 with that of the steering shaft 9. By this simple action, the above unitary modules are placed precisely at a predetermined desired position, with respect to the axis of the steering shaft 9. Further, as the assembly work is achieved by merely fixing the connector shell 21 around the steering column, assembly steps are greatly simplified.

Further, the cable reel 30 is placed on the same height level as the turnsignal system 22 and the lighting system 23, so that the height of the assembled connector structure 20 is lowered. Moreover, the turn-signal system 22 and the lighting system 23 are not stored in separate housings, but contained in the connector shell 21, so that the size and volume of the connector structure can be reduced, and the structure as a whole can be made more compact.

As can be understood from above, in the connector structure incorporating the cable reel and the combined switch systems according to the invention, the connector device units, respectively stored in a separate housing in the past, are stored in the sole connector shell, thereby obviating the need for corresponding separate housings, and the space necessary for mounting the device units is thus reduced. The clearance, otherwise necessary between the constitutive units, is also eliminated, so that the space can further be reduced.

As functional parts for switching systems are no longer stored in separate housings, additions to, and modifications of, these functional parts can be carried out more easily. The connector structure thus has a wider use.

Furthermore, all functional units are stored in the sole connector shell. Accordingly, when the central axis of the connector shell is joined with that of the steering shaft, those functional units are placed precisely at desired positions, with respect to the axis of the steering shaft.

Although the present invention has been described with reference to particular means, materials and embodiments, it is to be understood that the invention is not limited to the particulars disclosed and extends to all equivalents within the scope of the claims.

What is claimed:

1. A connector structure incorporating a cable reel and a switch system, said connector structure comprising:

a connector shell having an axis, said connector shell configured to be joined with a steering shaft having an axis, so that said connector shell axis and the steering shaft axes are alignable, said connector shell comprising a cylindrical section and two end portions, said cylindrical section fitting around said steering shaft in a freely rotatable manner, said connector shell further comprising a receptacle section including a shoulder portion extending outwardly from one end portion of said cylindrical section, a peripheral sidewall portion, and first and second parting strip portions symmetrically provided with respect to said axis of said connector shell, thereby forming, inside said receptacle section, a central zone between said first and second parting strip portions, a first peripheral zone between said peripheral sidewall portion of said receptacle section and said first parting strip portion, and a second peripheral zone between said peripheral sidewall portion of said receptacle section and said second parting strip portion;

said cable reel being mounted and fixed in said central zone of said receptacle section; and said switch system comprising at least a turn-indicator system and a lighting system, respectively mounted and fixed in said first peripheral zone of said receptacle portion and said second peripheral zone thereof.

2. The connector structure according to claim 1, wherein said cable reel comprises a mobile body portion including a top wall and an internal sidewall, and said top wall comprises a cancel cam formed unitarily and in one piece therewith.

3. The connector structure according to claim 1, wherein said cable reel comprises a mobile body portion including a top wall and an internal sidewall with projecting portions, said projecting portions being fixed with a main scale, said cable reel further comprises a fixed body portion including a bottom wall and an external sidewall, said external sidewall defining a third peripheral zone together with said peripheral sidewall portion of said receptacle section in an area between said first and second peripheral zones around said axis of said connector shell, and said third peripheral zone contains an encoder, such that said encoder is configured to detect the steering angle of said main scale.

4. The connector structure according to claim 2, wherein said cable reel comprises a mobile body portion including a top wall and an internal sidewall with projecting portions, said projecting portions being fixed with a main scale, said cable reel further comprises a fixed body portion including a bottom wall and an external sidewall, said external sidewall defining a third peripheral zone together with said peripheral sidewall portion of said receptacle section in an area between said first and second peripheral zones around said axis of said connector shell, and said third peripheral zone contains an encoder, such that said encoder is configured to detect the steering angle of said main scale.

5. The connector structure according to claim 1, wherein said connector structure further comprises a shell lid which includes a top wall having a center hole and an external sidewall, said center hole is configured to receive the main axis of a steering wheel in a freely rotatable manner, and said top wall and said external sidewall cover said connector shell.

6. The connector structure according to claim 2, wherein said connector structure further comprises a shell lid which includes a top wall having a center hole and an external sidewall, said center hole is configured to receive the main axis of a steering wheel in a freely rotatable manner, and said top wall and said external sidewall cover said connector shell.

7. The connector structure according to claim 3, wherein said connector structure further comprises a shell lid which includes a top wall having a center hole and an external sidewall, said center hole is configured to receive the main axis of a steering wheel in a freely rotatable manner, and said top wall and said external sidewall cover said connector shell.

8. The connector structure according to claim 4, wherein said connector structure further comprises a shell lid which includes a top wall having a center hole and an external sidewall, said center hole is configured to receive the main axis of a steering wheel in a freely rotatable manner, and said top wall and said external sidewall cover said connector shell.

9. The connector structure according to claim 5, wherein said shell lid is configured to also serve as a steering column cover.

10. The connector structure according to claim 6, wherein said shell lid is configured to also serve as a steering column cover.

11. The connector structure according to claim 7, wherein said shell lid is configured to also serve as a steering column cover.

12. The connector structure according to claim 8, wherein said shell lid is configured to also serve as a steering column cover.

* * * * *